United States Patent
Saquib et al.

(10) Patent No.: US 10,223,331 B2
(45) Date of Patent: Mar. 5, 2019

(54) WARP MODELS FOR REGISTERING MULTI-SPECTRAL IMAGERY

(71) Applicant: Goodrich Corporation, Charlotte, NC (US)

(72) Inventors: Suhail Shabbir Saquib, Shrewsbury, MA (US); Matthew D. Egan, Westford, MA (US)

(73) Assignee: Goodrich Corporation, Charlotte, NC (US)

( * ) Notice: Subject to any disclaimer, the term of this patent is extended or adjusted under 35 U.S.C. 154(b) by 372 days.

(21) Appl. No.: 15/094,123

(22) Filed: Apr. 8, 2016

(65) Prior Publication Data

US 2017/0293590 A1   Oct. 12, 2017

(51) Int. Cl.
  *G06F 17/11*   (2006.01)
  *G06T 7/32*    (2017.01)
  *G06F 17/16*   (2006.01)

(52) U.S. Cl.
  CPC .............. *G06F 17/11* (2013.01); *G06F 17/16* (2013.01); *G06T 7/32* (2017.01); *G06T 2207/10036* (2013.01); *G06T 2207/20182* (2013.01)

(58) Field of Classification Search
  None
  See application file for complete search history.

(56) References Cited

U.S. PATENT DOCUMENTS

| | | | |
|---|---|---|---|
| 7,298,869 B1 | 11/2007 | Abernathy | |
| 7,298,922 B1 | 11/2007 | Lindgren et al. | |
| 7,813,586 B2 | 10/2010 | Gutkowicz-Krusin et al. | |
| 8,194,952 B2* | 6/2012 | Mertz et al. | |
| 8,320,712 B2 | 11/2012 | Choi et al. | |
| 8,879,871 B2 | 11/2014 | Vadon et al. | |
| 9,223,021 B2 | 12/2015 | Goldman | |
| 2006/0181543 A1 | 8/2006 | Katsumata et al. | |
| 2013/0039559 A1* | 2/2013 | Grass | G06T 7/0026 382/131 |
| 2015/0324989 A1 | 11/2015 | Smith et al. | |

(Continued)

OTHER PUBLICATIONS

Keren, D. et al., "Image Sequence Enhancement Using Sub-Pixel Displacements", Proceedings of the Conference on Computer Vision and Pattern Recognition, Jun. 5-9, 19; [Proceedings of the Conference on Computer Vision and Pattern Recognition], Washington, IEEE Comp. Soc. Press, US, vol.-, Jun. 5, 1988, pp. 742-746,XP010012929, DOI: 10,1109/CVPR.1988.196317, ISBN: 978-0-8186-0862-9 *p. 742-744*.

(Continued)

*Primary Examiner* — Syed A Roni
(74) *Attorney, Agent, or Firm* — Locke Lord LLP; Scott D. Wofsy; Joshua L. Jones

(57) ABSTRACT

A method for modeling warp for registration of images includes receiving input warp data and performing a fitting process on the input warp data to produce at least one of reduced noise warp data or reduced noise warp uncertainty. The warp for the at least one of reduced noise warp data or reduced noise warp uncertainty is modeled with components including an offset that varies in time and a non-linear distortion that does not vary with time. The method also includes outputting at the least one of reduced noise warp data or reduced noise warp uncertainty.

22 Claims, 7 Drawing Sheets

(56) References Cited

U.S. PATENT DOCUMENTS

2015/0334315 A1     11/2015   Teich et al.
2016/0350893 A1*   12/2016   Fletcher ................ G06T 3/0081

OTHER PUBLICATIONS

Regis Perrier et al., "Satellite Image registration for Attitude Estimation With a Constrained Polynomial Model", 2010 17th IEEE International Conference on Image Processing (ICIP 2010); Sep. 26-29, 2010; Hong Kong, China, IEEE, Piscataway, NJ, USA, Sep. 26, 2010, pp. 925-928, XP031812578, ISBN: 978-1-4244-7992-4, *p. 926-927*, *figure 3*.

Partial European Search Report dated Jul. 17, 2017, issued during the prosecution of European Patent Application No. EP 17162280.6, (12 pages).

Extended European Search Report dated Oct. 18, 2017, issued during the prosecution of European Patent Application No. EP 17162280.6 (9 pages).

\* cited by examiner

WARP MODELS FOR REGISTERING MULTI-SPECTRAL IMAGERY

STATEMENT REGARDING FEDERALLY SPONSORED RESEARCH OR DEVELOPMENT

This invention was made with government support under a Contract awarded by an agency. The government has certain rights in the invention.

BACKGROUND OF THE INVENTION

1. Field of the Invention

The present disclosure relates to imagery, and more particularly to registration of multiple images such as used in multi-modality and multi-spectral imagery.

2. Description of Related Art

Registration between the different bands of multi-spectral imagery, e.g., acquired by an airborne or space sensor, is particularly challenging as the bands that are spectrally far apart do not correlate very well across the image. For example, bands deep in the IR region have both a reflective and an emissive component whereas the bands in the visual region are purely reflective.

Simple phase correlation to obtain the warp is not very effective in these instances. Similarly, registering images acquired using different modalities such as LiDAR, narrow band spectral, and broad band visual photographic imagery present the same issues.

Conventional methods and systems have generally been considered satisfactory for their intended purpose. However, there is still a need in the art for improved image registration for multi-modal and multi-spectral images. The present disclosure provides a solution for this need.

SUMMARY OF THE INVENTION

A method for modeling warp for registration of images includes receiving input warp data and performing a fitting process on the input warp data to produce at least one of reduced noise warp data or reduced noise warp uncertainty. The warp for the at least one of reduced noise warp data or reduced noise warp uncertainty is modeled with components including an offset that varies in time and a non-linear distortion that does not vary with time. The method also includes outputting at the least one of reduced noise warp data or reduced noise warp uncertainty.

The warp can be modeled with components including a slope that varies in time. Performing the fitting process can include modeling the slope and offset as splines. Performing the fitting process can include modeling the non-linear distortion as a polynomial.

The method can include receiving input warp data uncertainty for the input warp data, wherein performing the fitting process includes using the input warp data uncertainty in producing the reduced noise warp data. Performing the fitting process can include correcting errors in the input warp data uncertainty by performing a robust fitting process on the input warp data.

The method can include predicting reduced noise warp uncertainty and utilizing the reduced noise warp uncertainty to generate a refined warp by incorporating motion data, and registering a warped band using the refined warp. It is also contemplated that the method can include predicting reduced noise warp uncertainty using the input warp data uncertainty and utilizing the reduced noise warp uncertainty to generate a refined warp by incorporating motion data, and registering a warped band using the refined warp.

A sensor model can be used to produce warp data from motion and motion warp uncertainty, wherein the refined warp is produced by combining the reduced noise warp, the reduced noise warp uncertainty, the warp data from motion, and the motion warp uncertainty. Combining the reduced noise warp, the reduced noise warp uncertainty, the warp data from motion, and the motion warp uncertainty can include obtaining the refined warp $\vec{h}$ as $$\vec{h}(\Sigma_{\hat{d}}^{-1}+\Sigma_{\hat{g}}^{-1})^{-1}(\Sigma_{\hat{d}}^{-1}\vec{d}+\Sigma_{\hat{g}}^{-1}\vec{g})$$

where $\hat{\vec{d}}$ is the reduced noise warp, $\Sigma_{\hat{d}}$ is the reduced noise warp uncertainty, $\hat{\vec{g}}$ denotes the warp data from motion, and $\Sigma_{\hat{g}}$ denotes the motion warp uncertainty.

The method can also include:

using the input warp data uncertainty to produce relative input warp data uncertainty;

using the relative input warp data uncertainty in a warp model robust fit to produce fit weights;

using the fit weights and relative input warp data uncertainty to produce corrected relative input warp data uncertainty;

predicting relative reduced noise warp data uncertainty from the corrected relative input warp data uncertainty;

using the reduced noise warp data and the input warp data to estimate input noise variance; and multiplying the relative reduced noise warp data uncertainty and the input noise variance to produce the reduced noise warp data uncertainty.

A smoothing model for slope and offset spline coefficients can be incorporated in the fitting process. Incorporating a smoothing model in the fitting process can include minimizing curvature of the offset and slope splines. The splines can have non-uniformly placed knots. The splines can be cubic.

The fitting process can include modeling the warp as $$d_x(x,y)=s_y(y)x+c_x(y)+o_x(x)$$

$$d_y(x,y)=s_y(y)x+c(y)+o_y(x).$$

where $d_x(\bullet,\bullet)$ and $d_y(\bullet,\bullet)$ are x and y components of the warp, respectively, $s_x(\bullet)$ and $c_x(\bullet)$ denote slope and offset as a function of time for the x component of the warp, $s_y(\bullet)$ and $c_y(\bullet)$ denote the slope and offset as a function of time for the y component of the warp, and $o_x(\bullet)$ and $o_y(\bullet)$ denote distortion that is constant in time but varies along a sensor array, and y in the functions denotes time and x in the functions denotes distance along the sensor array.

A method for registration of images includes receiving a reference image and a warped image, correlating the reference and warped images to produce noisy warp data, and performing a fitting process on the noisy warp data to produce reduced noise warp data. The warp for the reduced noise warp data is modeled with components including an offset that varies in time, and a non-linear distortion that does not vary with time. The method also includes resampling the warped image using the reduced noise warp data to produce a registered image that is registered to the reference image.

Correlating the reference and warped images can include producing warp data uncertainty. Performing the fitting process can include generating reduced noise warp uncertainty. The method can include receiving motion data and combining the motion data with the reduced noise warp and the reduced noise warp uncertainty to produce a refined warp, wherein resampling the warped image using the reduced noise warp data includes using the refined warp to produce the registered image.

A system includes a module configured to implement machine readable instructions to perform any embodiment of the methods described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1A:
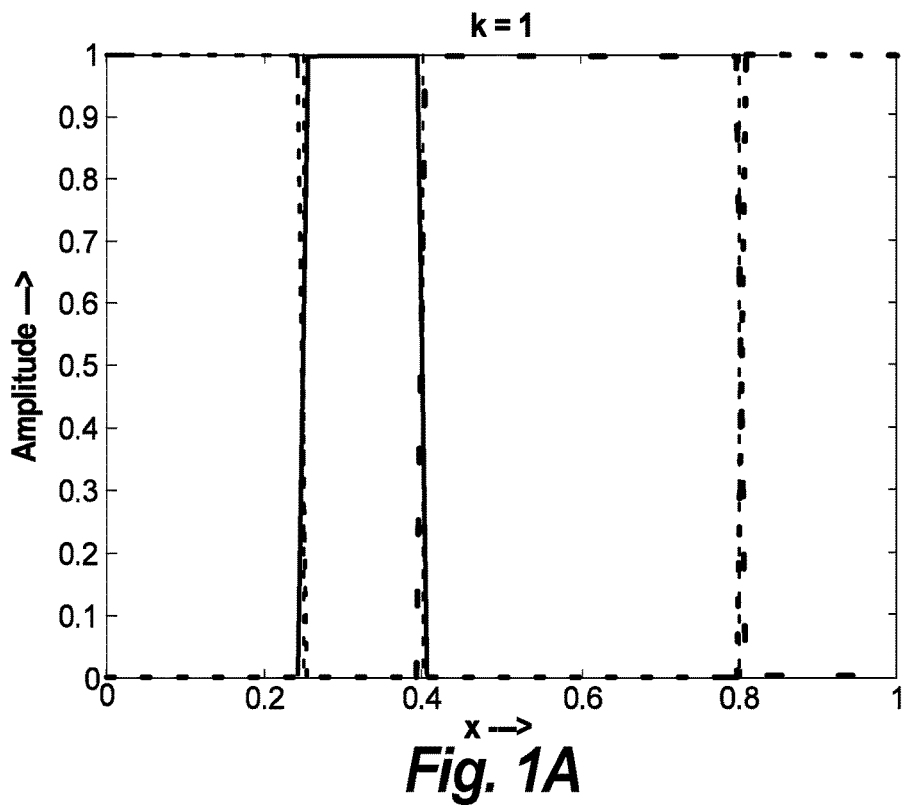
FIGS. 1A-1D are a set of graphs showing spline basis functions in accordance with an exemplary embodiment of the present disclosure.
Figure 1B:
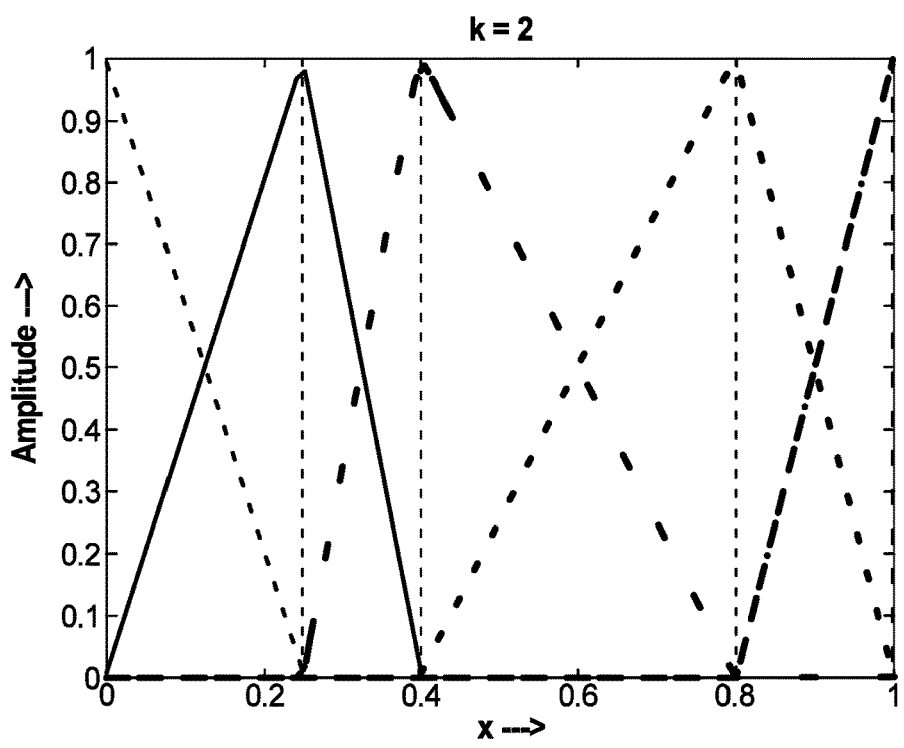
Figure 1C:
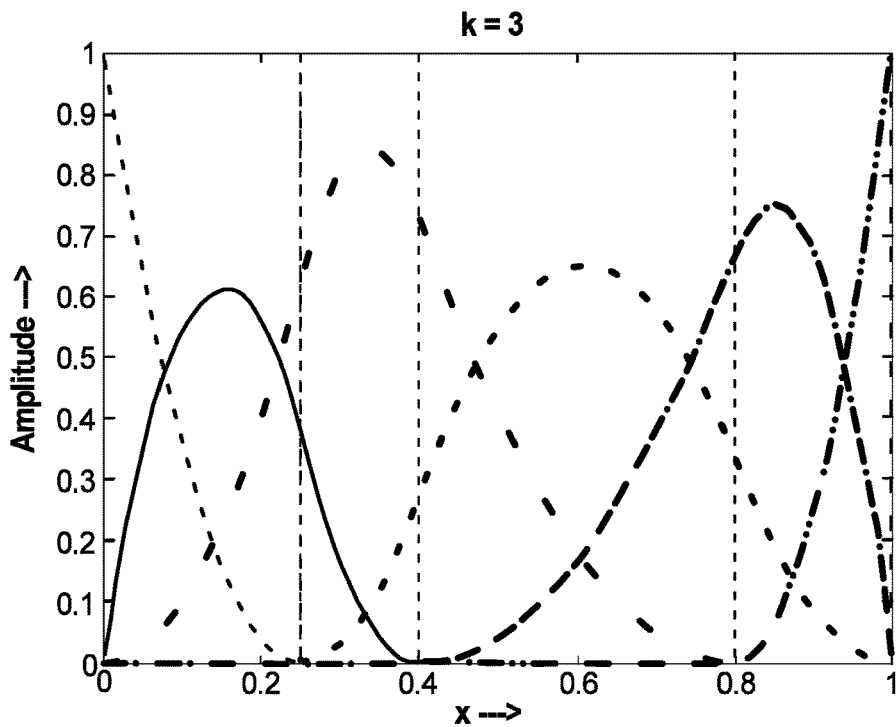
Figure 1D:
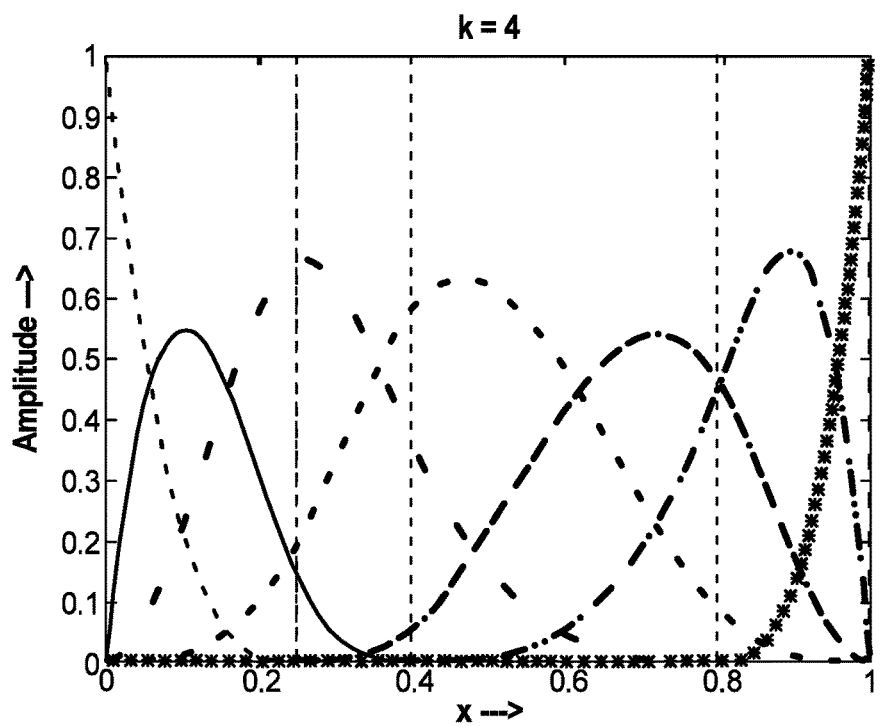
Figure 2:
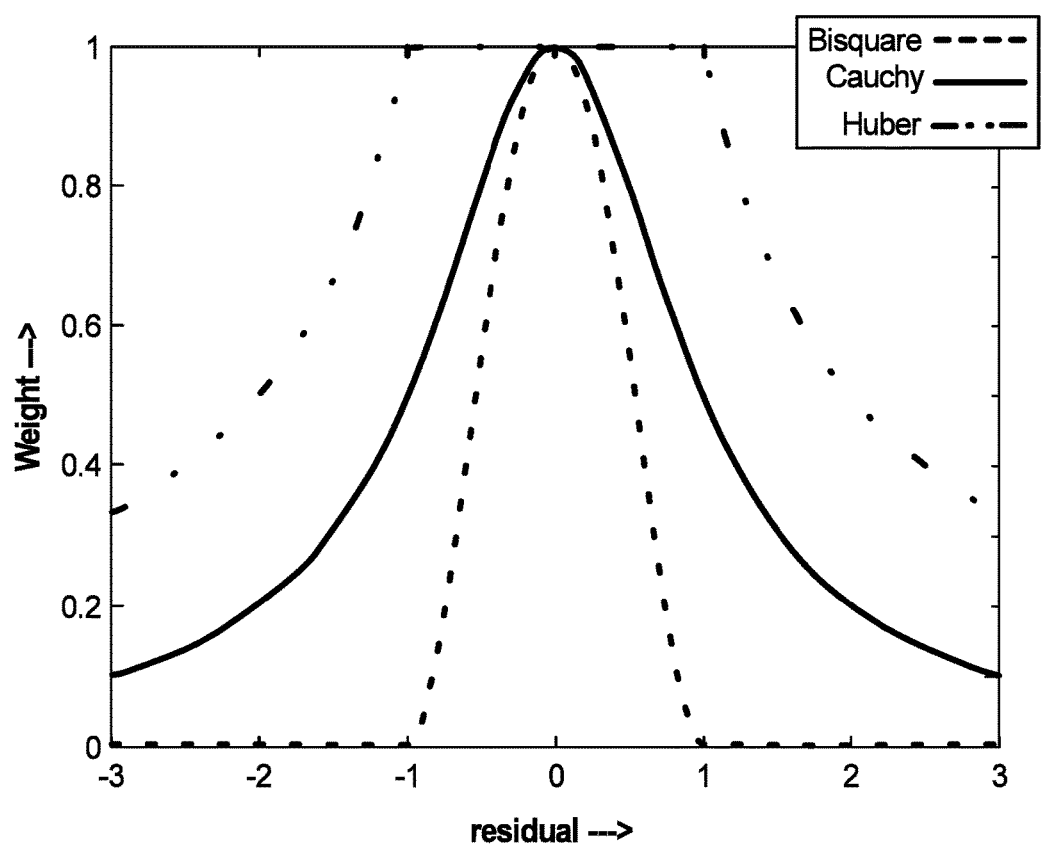
FIG. 2 is a graph showing three exemplary functions for assigning weights to data samples in accordance with an exemplary embodiment of the present disclosure.
Figure 3:
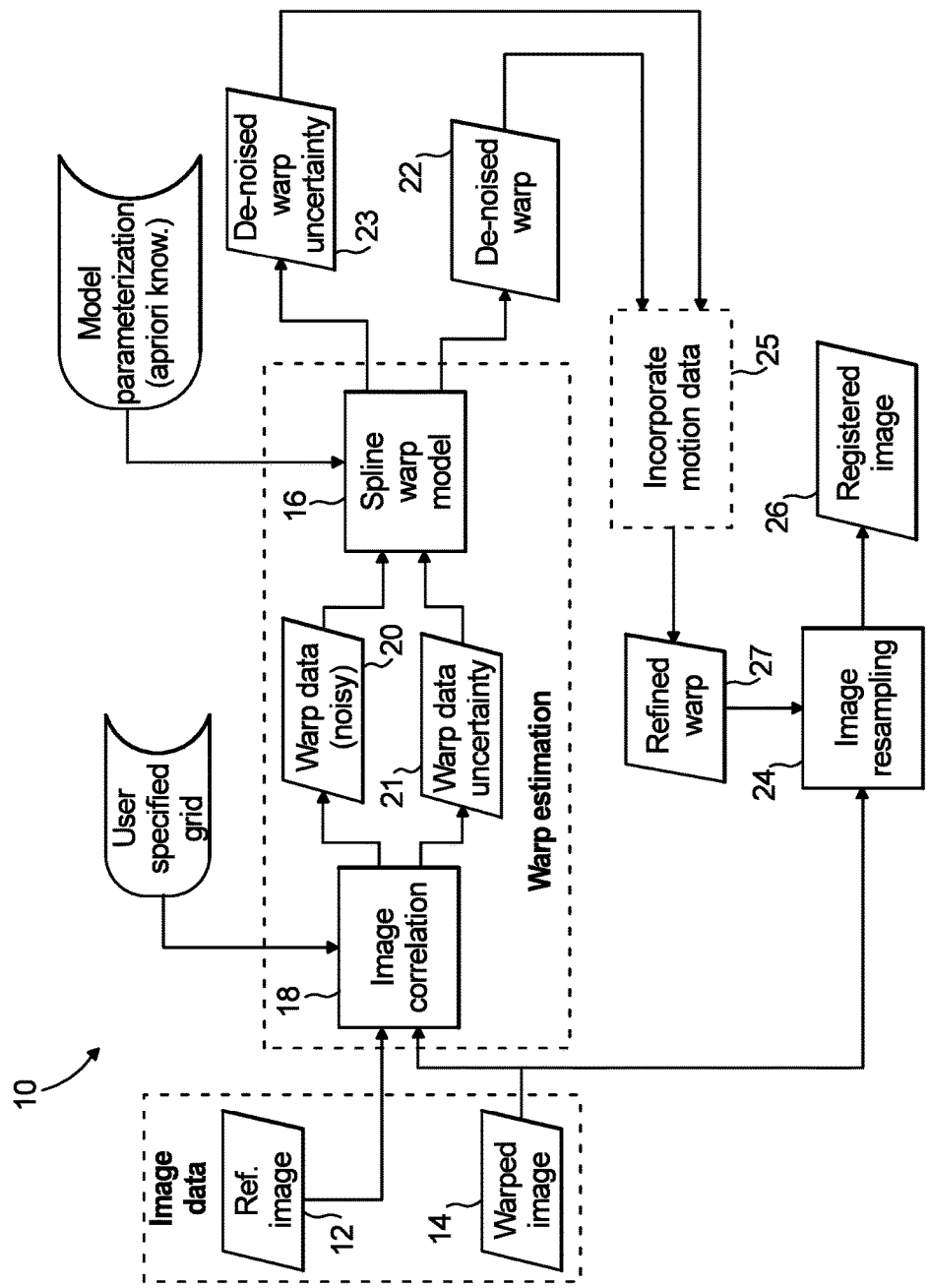
FIG. 3 is a data flow diagram of an exemplary embodiment of image registration in accordance with the present disclosure.

Reference will now be made to the drawings wherein like reference numerals identify similar structural features or aspects of the subject disclosure. For purposes of explanation and illustration, and not limitation, a partial view of an exemplary embodiment of a method in accordance with the disclosure is shown in FIG. 3 and is designated generally by reference character 10. Other embodiments of methods in accordance with the disclosure, or aspects thereof, are provided in FIGS. 1A-1D, 2 and 4-6, as will be described. The systems and methods described herein can be used for multi-modal/multi-spectral image registration.

1 Separable Spline Warp Model

Let $\{x_w, y_w,\}$ denote the coordinates in a warped band image that correspond to the coordinates $\{x, y\}$ in a reference band image. Let $$d_x(x,y)=x_w(x,y)-x \quad (1)$$

$$d_y(x,y)=y_w(x,y)-y \quad (2)$$

denote the space varying translation between the warped and the reference band. Assume the images of the reference and warped bands are acquired by two linear sensor arrays displaced from each other spatially. The sensor arrays are mounted on an airborne or space platform and the images are obtained by scanning the arrays in time as the platform moves. The platform motion may not be perfectly uniform in time and this causes a time-dependent warping between the bands. We will use x for the direction along the sensor arrays (fast-scan) and the y for the time dimension (slow-scan.) Given the rigid geometry in the x direction, we expect the warping to be linear in this direction unless there is uncorrected optical distortion. The linear warping in x will be time dependent but the optical distortion will be constant in time. Let $s_x(\bullet)$ and $c_x(\bullet)$ denote the slope and offset as a function of time for the linear mapping of the warp in the x component. Similarly, let $s_y(\bullet)$ and $c_y(\bullet)$ denote the slope and offset for the y component of the warp in time. Let $o_x(\bullet)$ and $o_y(\bullet)$ denote the relative optical distortion between the warped and the reference band along the sensor array for the x and y component respectively. We model the space varying translation between the bands as follows $$d_x(x,y)=s_x(y)x+c_x(y)+o_x(x)$$

$$d_y(x,y)=s_y(y)x+c_y(y)+o_y(x). \quad (3)$$

Note that this is nothing but a Taylor series expansion of the delta warp d(x, y) along the x direction with the zeroth and first order coefficients as functions of y (time) and the higher order coefficients constant in time.

In the subsequent treatment, we will use $v=\{x, y\}$ as an index for x or y. Since the equations are similar for the translations in x and y, this makes for compact notation. Assuming the platform motion is more or less steady, the slope and offset, $s_*(\bullet)$ and $c_*(\bullet)$, will be smooth functions of time, y. We choose to model them as B-splines and they can written as a summation of a set of basis functions as $$s_v(y) = \sum_{j=1}^{n_s} s_{vj} B_{j,k}^s(y), \quad (4)$$

$$c_v(y) = \sum_{j=1}^{n_c} B_{j,k}^c(y), \quad (5)$$

where $n_s$ and $n_c$ are the number of basis functions that are chosen for the slope and offset functions respectively. The number of knots and the spline order k determines the number of basis functions. See Sec. 1.1 for generating the set of basis functions $B_{j,k}(\bullet)$, j=1 ... n given the order and knot locations.

The optical distortion can either be modeled as a B-spline or a polynomial $$\sum_{j=1}^{n_o} o_{vj} B_{j,k}^o(x) \text{ or } o_v(x) = \sum_{j=1}^{n_o} o_{vj} x^{e_j}, \quad (6)$$

where $n_o$ denotes the number of basis functions and $e_j$, j=1, ... ,$n_p$, denotes the $n_o$ exponents chosen for the polynomial basis. In the subsequent treatment, we will use $B_{j,k}^o(\bullet)$ either for the spline basis or the polynomial basis.

1.1 Recursive Generation of B-Spline Basis Functions

To generate the B-spline functions, the number and location of the knots need to be specified along with the order of the spline. Let the knots sequence be denoted as $t_1 \leq t_2 \leq \ldots \leq t_n$, where n is the number of knots. Let k denote the order of the spline where k=1 denotes the $0^{th}$ order spline. The B-spline basis functions for any order k is generated recursively from the previous order basis functions. The knots sequence is augmented for each order k as follows $$t^{(k)} = \{\underbrace{t_1, \ldots, t_1}_{k \text{ times}}, t_2, \ldots, t_{n-1}, \underbrace{t_n, \ldots, t_n}_{k \text{ times}}\}. \tag{7}$$

The recursion of the B-spline at any order k>1 is given as $$B_{j,k}(x) = \frac{x - t_j^{(k)}}{t_{j+k-1}^{(k)} - t_j^{(k)}} B_{j-1,k-1}(x) + \frac{t_{j+k}^{(k)} - x}{t_{j+k}^{(k)} - t_{j+1}^{(k)}} B_{j,k-1}(x), \tag{8}$$

$$j = \ldots, n+k-2, k > 1,$$

and is initialized at k=1 as $$B_{j,1}(x) = \begin{cases} 1 & t_j \leq x < t_{j+1}, j = 1, \ldots, n-2 \\ 1 & t_j \leq x \leq t_{j+1}, j = n-1 \\ 0 & \text{otherwise} \end{cases} \tag{9}$$

FIGS. 1A-1D show this recursion from k=1 to k=4 to generate the cubic splines (k=4) for a non-uniformly spaced knots sequence [0,0.25,0.4,0.8,1].

1.2 Warping model parameter estimation

The unknown spline coefficients for slope, offset, and optical distortion need to estimated. This is achieved by fitting the warping model Eq. (3) to the warping data obtained by the image correlation algorithm at a discrete set of tie points. To obtain the warp data at the tie points, methods such as phase correlation on local images of the warped band and the master band centered on the tie points may be empolyed. Such methods are known to those skilled in the art. Let $\{x_i, y_i\}$, i=1, . . . , m denote a set of m grid points at which the warp has been estimated. To facilitate the estimation of the unknown coefficient, we rewrite Eq. (3) in vector-matrix notation $$d = Ap, \tag{10}$$

where $$A = \begin{bmatrix} B_{1,k}^s(y_1)x_1 & \ldots & B_{n_s,k}^s(y)x_1 & B_{1,k}^c(y_1) & \ldots & B_{n_c,k}^c(y_1) & B_{1,k}^o(x_1) & \ldots & B_{n_o,k}^o(x_1) \\ \vdots & \ddots & \vdots & \vdots & \ddots & \vdots & \vdots & \ddots & \vdots \\ B_{1,k}^s(y_m)x_m & \ldots & B_{n_s,k}^s(y_m)x_m & B_{1,k}^c(y_m) & \ldots & B_{n_c,k}^c(y_m) & B_{1,k}^o(x_1) & \ldots & B_{n_o,k}^o(x) \end{bmatrix} \tag{11}$$

is a m×n matrix, where $n_p = n_s + n_c + n_o$, and $$p = \begin{bmatrix} s_{x1} & s_{y1} \\ \vdots & \vdots \\ s_{xn_s} & s_{yn_s} \\ c_{x1} & c_{y1} \\ \vdots & \vdots \\ c_{xn_c} & c_{yn_c} \\ o_{x1} & o_{y1} \\ \vdots & \vdots \\ o_{xn_o} & o_{yn_o} \end{bmatrix}, d = \begin{bmatrix} d_x(x_1, y_1) & d_y(x_1, y_1) \\ \vdots & \vdots \\ d_x(x_m, y_m) & d_y(x_m, y_m) \end{bmatrix}, \tag{12}$$

are $n_p \times 2$ and m×2 matrices respectively. The matrix p has all the spline coefficients, the matrix d has all the data, and the matrix A is constructed based on the model structure. The spline basis functions have a compact local support and this makes the matrix A to be sparse. Note that bold case letters will be used to represent matrices. Subscripts on matrices will be used to identify rows (first index) and columns (second index) with denoting all indices. For example, $A_{i*}$, denotes the $i^{th}$ row and $A_{*j}$ denotes the $1^{th}$ column of matrix A. The first and second columns of p and d matrices contain the model coefficients and data for x and y respectively. Hence we will also use $p_{*v}$ or $d_{*v}$ with v taking values $\{x, y\}$ to denote the column vectors corresponding to x and y.

1.2.1 Least Squares Estimation of Spline Coefficients

Equation (10) compactly represents the warp model evaluated at the tie point grid where warping data is available either through image correlation or some other means. In general, the data from the image correlation process will be noisy either due to measurement process or correlation model mismatch as the image content may not match very well between the warped band and the master band. We would like to adjust the unknown spline coefficient to minimize the mean square error between the model predictions and the data. The least-squares estimate can be obtained in closed form and is given as $$\hat{p} = (A^t A)^{-1} A^t A \tag{13}$$

1.2.2 Weighted Least Squares Estimation of Spline Coefficients

The solution of Eq. (13) assumes that the noise is uniformly distributed across all the m data points and that the two components in x and y are independent. However, depending on how the data values are obtained for the warping, the noise may be quite variable between the data points and also coupled between the two components. Let W(i) denote the 2×2 weighting matrix for data point i based on the confidence we have on the estimate for that point. The inverse of the noise covariance matrix can be chosen as the weighting matrix. The weighted mean square error across all m data points in vector-matrix notation is given as $$C = \sum_{i=1}^{m} (A(i)\vec{p} - d_{i*}^t)^t W(i)(A(i)\vec{p} - d_{i*}^t), \tag{14}$$

where $$A(i) = \begin{bmatrix} A_{i*} & 0 \\ 0 & A_{i*} \end{bmatrix} \tag{15}$$

is a 2×2n matrix and $$\vec{p} = \begin{bmatrix} p_{*x} \\ p_{*y} \end{bmatrix} \quad (16)$$

is a $2n_p \times 1$ vector containing the spline coefficient for both components. The spline coefficients that minimize the mean square error C is obtained by differentiating Eq. (14) with respect to $\vec{p}$ and setting it equal to zero $$\left.\frac{\partial C}{\partial \vec{p}}\right|_{\vec{p}=\hat{\vec{p}}} = 0 \quad (17)$$

$$\sum_{i=1}^{m} 2A^t(i)W(i)\left(A(i)\hat{\vec{p}} - d_{i*}^t\right) = 0$$

$$\sum_{i=1}^{m} A^t(i)W(i)A(i)\hat{\vec{p}} = \sum_{i=1}^{m} A^t(i)W(i)d_{i*}^t$$

$$\hat{\vec{p}} = \left(\sum_{i=1}^{m} A^t(i)W(i)A(i)\right)^{-1} \left(\sum_{i=1}^{m} A^t(i)W(i)d_{i*}^t\right)$$

1.2.3 Special Case for Uncorrelated Components

If the x and y components are uncorrelated (weighting matrices W(i) are diagonal), then Eq. (17) can be simplified since the spline coefficient for x and y can be estimated independently. Let $$W_x = \begin{bmatrix} W_{11}^{(1)} & & 0 \\ & \ddots & \\ 0 & & W_{11}^{(m)} \end{bmatrix}, W_y = \begin{bmatrix} W_{22}^{(1)} & & 0 \\ & \ddots & \\ 0 & & W_{22}^{(m)} \end{bmatrix}, \quad (18)$$

be the m×m diagonal weighting matrices for x and y components respectively. Then the weighted least-squares solution for the two components is given as $$\hat{p}_{*v} = (A^t W_v A)^{-1} A^t W_v d_{*v}, v = \{x, y\} \quad (19)$$

Note that until now we have assumed the basis functions are the same for x and y components. This restriction can be easily relaxed by using a different matrix A for the x and y components. For the coupled solution given by Eq. (17), the matrix A(i) can be modified as $$A(i) = \begin{bmatrix} A_{x_i*} & 0 \\ 0 & A_{y_i*} \end{bmatrix}, \quad (20)$$

where $A_x$ and $A_y$ denotes the A matrix formed from the basis functions for x and y respectively.

1.2.4 Numerical Computation Considerations

The warping model matrix A can end up being badly scaled and ill-conditioned leading to a host of numerical issues in the solution of the model spline coefficients. The problem arises because the range of x and y may be large and quite different from each other. The large range of x makes the basis functions for the optical distortion model given by Eq. (6) to have a very large dynamic range if the polynomial model is chosen. With finite precision, the matrices will become rank deficient making it difficult to fit the data correctly. To overcome this problem, it is advisable to first normalize the range of the x and y between 0 and 1. The warping model is then fitted in the normalized domain and the results scaled back to the original domain for subsequent processing.

Also note the solutions in Eqs. (13), (17), and (19), require a matrix inverse. Although they have been written in that form, it is not advisable to compute the explicit inverse both from a numerical accuracy and performance considerations. Instead, it is better to take the inverted matrix to the other side of the equation and solve the resulting set of linear equations using Gaussian elimination.

1.2.5 Robust Weighted Least Squares

The previous Sections assumes that the noise in the data can be modeled as Gaussian. However, in practice if the data are generated using an image correlation procedure, the noise is very much image content dependent. Furthermore, if the image registration is being done between two different imaging modalities or very different spectral bands, the image correlation model may break down. Both of these factors can lead to large impulsive kind of noise that is not very well modeled by a unimodal normal distribution. The quadratic penalty resulting from the Gaussian assumption tends to be overly sensitive to outliers and the resulting least-squares solution can end up significantly biased. Towards this end, we would like to replace the quadratic penalty with alternative penalty functions that reduce the cost the model associates with large outlying values in the data. The optimal shape of the penalty function is given by actual probability distribution function of the noise in the data. In practice, it is difficult to come up with an accurate description of the noise. However, any penalty function that reduces the cost associated with large outlying values will tend to perform better in the case the data is corrupted by impulsive or heavier tail distributions.

One advantage of the weighted least squares method is that the solution comes out to be closed form. This will not be case if an alternative robust penalty function is employed. However, we can leverage the closed form solution for weighted least squares to come up with an iterative solution that assigns varying weights to each data point based on a determination of how well it fits the Gaussian distribution assumption. The weights vary during the iterative process as the model moves to fit the normally distributed data points and reject the outlying data values that do not fit the model very well.

1.2.6 Solution for uncorrelated components

This Section lays out the robust solution when the x and y components are uncorrelated. In this case, the model fitting in x and y can be carried out independently. For notational simplicity, we will drop the subscripts x and y on the matrices in this Section and give the robust solution for the general problem $$A\vec{p} = \vec{d} \quad (21)$$

where A is the model matrix, $\vec{d}$ is the data vector and $\vec{p}$ is the vector of unknown model coefficients. Note that the general formulation given by Eq. (21) includes the case where we have a weighting matrix W. The effect of the weighting is incorporated in the model matrix and the data vector as follows:

$$A \rightarrow W^{1/2}A, \hat{d} \rightarrow W^{1/2}\vec{d}. \quad (22)$$

The robust fitting method proceeds by assigning weights to each of the data points at each iteration based on its determination of how likely the point is an outlier or not. Let l denote the iteration index and let $w_i^{(l)}$ denote the weight associated with the $i^{th}$ data point at iteration l. The weights are all initialized to one at the first iteration, $w_*^{(1)}=1$. The weights at each iteration l are put into a diagonal weighting matrix denoted as $W^{(l)}$. The solution at iteration l is given as $$\vec{p}^{(l)}=(A^tW^{(l)}A)^{-1}A^tW^{(l)}\vec{d} \quad (23)$$

The model fitting error is given by the residual $$\vec{r}^{(l)}=A\vec{p}^{(l)}-\vec{d} \quad (24)$$

It can be shown that the covariance of the residuals is given as $$E[\vec{r}\,\vec{r}^{\,t}]=(I-P)\sigma^2 \quad (25)$$

where $\sigma^2$ is the variance of the noise in the data and P is the projection matrix $$P=A(A^tA)^{-1}A^t \quad (26)$$

Given the result of Eq. (25), we can normalize the residuals at each iteration to obtain a unit variance random variable $$\tilde{r}_i^{(l)} = \frac{r_i^{(l)}}{\sqrt{1-P_{ii}}\,\hat{\sigma}^{(l)}}, \quad (27)$$

where $\hat{\sigma}^{(l)}$ is an estimate of the noise standard deviation at iteration l. The quantity $(1-P_{ii})$ is known as the leverage for data sample i. We need to obtain a robust estimate of $\sigma$ in the presence of outliers. The ML estimate given by the root mean square error is too susceptible to large outlying values. Instead, we choose the median of the absolute deviation as our robust estimate $$\hat{\sigma}^{(l)} = 1.4826\, \text{median}\left(\left|\frac{r_i^{(l)}}{\sqrt{1-P_{ii}}}\right|\right). \quad (28)$$

The factor 1.4826 is chosen such that if the samples are drawn from a Gaussian distribution with no outliers, the robust estimate is equal to the ML estimate.

The normalized residuals are then passed through a weighting function $\rho(\cdot)$ that assigns weights to each data sample. For robustness, we would like to dial down the weights as the normalized residual gets large signaling an outlier. There are numerous functions in the literature that achieve this purpose. FIG. 2 shows three of the most commonly used functions for this purpose. Large residual error signals a model misfit and is given lower weight in the fitting process to achieve robustness to outliers. We will use the bisquare function given as $$\psi(r) = \begin{cases} (1-r^2)^2 & |r|<1 \\ 0 & \text{otherwise} \end{cases}. \quad (29)$$

The weights at each iteration l are obtained as $$w_i^{(l)}=\psi(\tilde{r}_i^{(l)}/4.685) \quad (30)$$

where scaling factor 4.685 has been chosen to obtain 95% efficiency with respect to the ordinary least square estimate when no outliers are present. This choice basically sets the weights of sample data that is more the 4.685 standard deviations away to zero. Note that the choice of the scaling factor depends on the form of the weighting function and will be different for the Huber and the Cauchy functions shown in FIG. 2.

The procedure outlined in this Section is repeated until the estimate of the unknown model coefficients given by Eq. (23) converges or the maximum number of iterations are exceeded.

1.3 Smoothing model

The smoothness of the slope and offset profiles in time is implicitly determined by the choice of the number of spline coefficients and their placement. A small number of evenly spaced knots constrains the profiles to be smooth. Increasing the number of knots frees up the profiles to change more quickly. Ideally, we would like the splines to be flexible enough to fit all the good data. However, choosing a large number of knots can make the results vary wildly in areas where there is no data to constrain the solution. The numerical solutions proposed in Section 1.2 do not guarantee a minimum norm solution.

The implicit specification of smoothing is undesirable since it shifts the difficultly to optimal estimation of the number and placement of knots. Instead, we use an explicit smoothing model in the optimization problem. The original cost function minimized the mean square error between the model and the data. We add to this function a roughness penalty that will favor smoother solutions. We formulate the roughness penalty as the integrated square of the second derivative of the slope and offset functions given as $$\lambda_s \int \left|\frac{d^2}{dy^2}s_v(y)\right|^2 dy + \lambda_c \int \left|\frac{d^2}{dy^2}c_v(y)\right|^2 dy, v=\{x,y\} \quad (31)$$

where $\lambda_s$ and $\lambda_c$ denote the weights assigned to the roughness terms for the slope and offset respectively. Using Eqs. (4) and (5), we obtain $$\frac{d^2}{dy^2}s_v(y) = \sum_{j=1}^{n_s} s_{vj}\frac{d^2}{dy^2}B_{j,k}^s(y), \quad (32)$$

$$\frac{d^2}{dy^2}c_v(y) = \sum_{j=1}^{n_c} c_{vj}\frac{d^2}{dy^2}B_{j,k}^c(y). \quad (33)$$

To make the computation tractable, we approximate the integral in Eq. (31) as a sum by evaluating the second derivatives only at the knot locations. For a cubic spline (k=4) with uniformly distributed knot locations at $\{t_1, \ldots, t_n\}$, we have the following approximate relationship if we ignore edge effects $$\frac{d^2}{dy^2}B_{j,k}(y) \propto \begin{cases} -2 & y=t_j \\ 1 & y=\{t_{j-1},t_{j+1}\} \\ 0 & \text{otherwise} \end{cases} \quad (34)$$

Substituting Eq. (34) in Eqs. (32) and (33), we obtain $$\frac{d^2}{dy^2}s_v(t_j) \propto -2s_{vj}+s_{vj-1}+s_{vj+1}, \quad (35)$$

$$\frac{d^2}{dy^2} c_v(t_j) \propto -2c_{vj} + c_{vj-1} + c_{vj+1}. \qquad (36)$$

Approximating the integral in Eq. (31) with a discrete sum evaluated at the knots locations given by Eqs. (35) and (36), we obtain $$\int \left| \frac{d^2}{dy^2} s_v(y) \right|^2 \qquad (37)$$

$$dy \propto \sum_{j=2}^{n_s-1} |2s_{vj} - s_{vj-1} - s_{vj+1}|^2 + |s_{v1} - s_{v2}|^2 + |s_{vn_s} - s_{vn_s-1}|^2$$

$$\int \left| \frac{d^2}{dy^2} c_v(y) \right|^2 \qquad (38)$$

$$dy \propto \sum_{j=2}^{n_c-1} |2c_{vj} - c_{vj-1} - c_{vj+1}|^2 + |c_{v1} - c_{v2}|^2 + |c_{vn_c} - c_{vn_c-1}|^2.$$

Note that the expressions for the integrated squared second derivative in eqs. (37) and (38) are only approximate but they are reasonably accurate for our purposes. To enable us to write the roughness penalty in vector-matrix notation, we define $$D_n = \begin{bmatrix} 1 & -1 & & & & \\ -1 & 2 & -1 & & & \\ & \ddots & \ddots & \ddots & & \\ & & -1 & 2 & -1 \\ & & & -1 & 1 \end{bmatrix} \} nrows, \qquad (39)$$

$$ncolumns$$

to be a matrix that operates on a vector of length n and computes the second order finite difference. Note that $D_n$ is approximately a Toeplitz matrix with the first and last rows adjusted to sum to zero. Using $D_n$, we construct a $(n_s+n_c) \times n_p$ matrix $$D = \begin{bmatrix} \sqrt{\lambda_s} D_{n_s} & 0_{n_s \times n_c} & 0_{n_s \times n_o} \\ 0_{n_c \times n_s} & \sqrt{\lambda_c} D_{n_c} & 0_{n_c \times n_o} \end{bmatrix} \qquad (40)$$

that can directly operate on the model parameter vector $p_{*_x}$ or $p_{*_y}$ to obtain the second order finite differences of the slope and offset spline coefficients. The notation $0_{n_s \times n_o}$ denotes a $n_s \times n_o$ matrix of all zeros. The overall cost function to be minimized for the x and y model is given as $$C_v = \underbrace{(Ap_{*_v} - d_{*_v})^t (Ap_{*_v} - d_{*_v})}_{dataterm} + \underbrace{(Dp_{*_v})^t (Dp_{*_v})}_{smoothnessterm} \qquad (41)$$

$$= (\overline{A} p_{*_v} - \overline{d}_{*_v})^t (\overline{A} p_{*_v} - \overline{d}_{*_v}), v = \{x, y\},$$

where $$\overline{A} = \begin{bmatrix} A \\ D \end{bmatrix} \qquad (42)$$

denotes the model matrix augmented by the second derivative matrix and $$\overline{d} = \begin{bmatrix} d \\ 0_{(n_s+n_c) \times 2} \end{bmatrix} \qquad (43)$$

denotes the data augmented by zeros (constraints for second derivative.) Minimizing the cost function $C_v$ with respect to the parameters yields $$\hat{p} = (\overline{A}^t \overline{A})^{-1} \overline{A}^t \overline{d} \qquad (44)$$

$$= (\overline{A}^t \overline{A})^{-1} A^t d \qquad (45)$$

If weights (inverse noise covariance) are available for the data points, the cost function is modified as $$C_v = (Ap_{*_v} - d_{*_v})^t W_v (Ap_{*_v} - d_{*_v}) + (Dp_{*_v})^t (Dp_{*_v}), v = \{x, y\} \qquad (46)$$

The optimal solution is given as $$\hat{p}_{*_v} = (\overline{A}^t \overline{W}_v \overline{A})^{-1} \overline{A}^t \overline{W}_v \overline{d}_v, v = \{x, y\} \qquad (47)$$

where $\overline{W}_v$ denotes the weight matrix augmented by the weights for the smoothing constraints $$\overline{W}_v = \begin{bmatrix} W_v & 0 \\ 0 & I_{n_s+n_c} \end{bmatrix}, v = \{x, y\}. \qquad (48)$$

Here $I_n$ denotes an identity matrix of size n×n.

To obtain a robust solution, the prescription given in Sec. 1.2.6 can be followed using the augmented model matrix $\overline{A}$ and data vector $\overline{d}$ with the user supplied weights folded in. Note that this will treat the additional $n_s+n_c$ constraints given by matrix D as data points and obtain robust weights for them depending on how well the constraints can be satisfied. If this is not desirable, then a procedure similar to that outlined in Sec. 1.2.6 can be formulated that obtains robust weights for only the data points and then computes the model parameters using the robust weights and the smoothing model.

1.4 Uncertainty Prediction of Model Output

In this Section, the subscript v denoting x or y will be dropped for notational simplicity as the equations are same for both x and y. $E[\cdot]$ denotes the expectation operator and bold case is used to specify the random variables over which the expectation is computed and for denoting matrices. Since the expectation in this Section is always computed on vectors (denoted with ), there should be no confusion between the two. Estimated quantities will be denoted by a ˆ and matrices and vectors augmented by the smoothing constraints denoted by a ̄.

We are interested in computing the expected mean square error (MSE) between the warp model predictions $\vec{d}$ and the ground truth warp $\vec{d}_t$ as a measure of accuracy of the model output. In practice, the ground truth warp is not available but it will not be required if the model predictions are unbiased as shown below $$MSE(\hat{\vec{d}}) = E[(\hat{\vec{d}} - \vec{d}_t)(\hat{\vec{d}} - \vec{d}_t)^t] \quad (49)$$
$$= E[(\hat{\vec{d}} - \vec{d}_t)(\hat{\vec{d}} - \vec{d}_t)^t] + \underbrace{(E[\hat{\vec{d}}] - \vec{d}_t)(E[\hat{\vec{d}}] - \vec{d})^t}_{=0(bias)}$$
$$= \Sigma_{\hat{d}},$$

where $\Sigma_{\hat{d}}$ denotes the covariance matrix of the model predictions.

Assuming the warp formulated in Sec. 1 models physical reality closely, the model predictions based on image correlation data will be unbiased making Eq. (49) valid. In practice, the bias term will be small and the covariance of the model output will accurately predict the MSE.

We will derive the expression for $\Sigma_{\hat{d}}$ for the most general case including the smoothing model and robust fitting. Reducing to the special cases of no smoothing model with and without robust fitting is then trivial. Let W denote the weighting matrix for the data points that is obtained by multiplying the specified weights (if any), which are ideally set to the inverse covariance matrix of the input data for optimality, with the weights obtained during robust fitting (if enabled). If the input data has no specified weights and robust fitting is not performed, this will be the identity matrix. As before, $\overline{W}$ denotes the augmented matrix with the smoothing weights included if the smoothing model is employed. Then the model prediction can be obtained using Eqs. (10) and (47)

$$\hat{\vec{d}} = A\vec{p} = A(\overline{A}^t\overline{W}\overline{A})^{-1}\overline{A}^t\overline{W}\overline{\vec{d}} = F\vec{d} \quad (50)$$

where the filtering matrix $$F = A(\overline{A}^t\overline{W}\overline{A})^{-1}\overline{A}^t\overline{W} \quad (51)$$

maps the input warp data to the output model prediction. Using Eq. (50), the model prediction covariance can be computed as $$E_{\hat{d}} = E[(\hat{\vec{d}} - \vec{d}_t)(\hat{\vec{d}} - \vec{d}_t)^t] \quad (52)$$
$$= E[(F\vec{d} - FE[\vec{d}])(F\vec{d} - FE[\vec{d}])^t]$$
$$= F\Sigma_{\vec{d}}F^t,$$

where $E_{\vec{d}}$ is the covariance of the input augmented data. If we trust the input data covariance supplied by the user (no robust fitting performed), Eq. (52) gives us the covariance of the prediction for the most general case.

However, in practice, the input data covariance estimated from image correlation process may be inaccurate for some number of points. The robust fitting procedure of Sec. 1.2.5 is designed precisely to identify such outlier data points. The robust fitting weights can be regarded as corrections to the weights derived from the supplied input data covariance matrix. In essence, the overall weight matrix $\overline{W}$, which includes the robust fitting weights, is a refined estimate of the inverse covariance of the input data up to a scale factor. The absolute scale of the input covariance cannot be estimated as part of the robust fitting procedure since only the relative weights between the data points matter in the fitting procedure. In practice, the data weights are usually normalized to unity mean to make them unitless. This makes it easier to specify a fixed amount of smoothing through the smoothing weights independent of the scale of the input data. The estimated input data covariance in terms of the weights is given as $$\hat{\Sigma}_{\vec{d}} = \sigma_d^2 \overline{W}^{-1} \quad (53)$$

where $\sigma_d^2$ is an unknown scale factor that needs to be estimated. Substituting Eqs. (53) and (51) in (52), we obtain $$\Sigma_{\hat{d}} = A(\overline{A}^t\overline{W}\overline{A})^{-1}\overline{A}^t\overline{W}\sigma_d^2\overline{W}^{-1}\overline{W}\overline{A}(\overline{A}^t\overline{W}\overline{A})^{-1}A^t \quad (54)$$
$$= \sigma_d^2 A(\overline{A}^t\overline{W}\overline{A})^{-1}A^t.$$

1.4.1 Estimation of $\sigma_d^2$

The residual of the augmented data is given as $$\vec{\bar{d}} - \hat{\vec{\bar{d}}} = (I - \overline{F})\vec{\bar{d}} \quad (55)$$

where $$\overline{F} = \overline{A}(\overline{A}^t\overline{W}\overline{A})^{-1}\overline{A}^t\overline{W} \quad (56)$$

denotes the augmented filtering matrix on the same lines as Eq. (51). Given the linear relationship of the residual to the data and assuming Eq. (53) holds, the residual covariance can be simplified as $$E[(\vec{\bar{d}} - \hat{\vec{\bar{d}}})(\vec{\bar{d}} - \hat{\vec{\bar{d}}})^t] = (I - \overline{F})\Sigma_{\vec{\bar{d}}}(I - \overline{F})^t \quad (57)$$
$$= \Sigma_{\vec{\bar{d}}} - \overline{F}\Sigma_{\vec{\bar{d}}} - \Sigma_{\vec{\bar{d}}}\overline{F}^t + \overline{F}\Sigma_{\vec{\bar{d}}}\overline{F}^t$$
$$= \Sigma_{\vec{\bar{d}}}(I - \overline{F})^t$$
$$= \sigma_d^2(I - \overline{F})\overline{W}^{-1},$$

where the third line uses the identity $\overline{F}\Sigma_{\vec{\bar{d}}} = \overline{F}\Sigma_{\vec{\bar{d}}}\overline{F}^t$. Rearranging the terms in Eq. (57) gives $$\sigma_d^2 I = \overline{W}(I - \overline{F})^{-1} E[(\vec{\bar{d}} - \hat{\vec{\bar{d}}})(\vec{\bar{d}} - \hat{\vec{\bar{d}}})^t]. \quad (58)$$

Taking the trace of both sides and approximating the expectation with a single instance of the data (replacing the expectation with a single instance is a very crude approximation, but we make up for that by the trace operation that averages all the data points), we obtain $$\hat{\sigma}_d^2 = \frac{1}{m + n_a} Tr[\overline{W}(I - \overline{F})^{-1}(\vec{\bar{d}} - \hat{\vec{\bar{d}}})(\vec{\bar{d}} - \hat{\vec{\bar{d}}})^t] \quad (59)$$
$$= \frac{1}{m + n_a}(\vec{\bar{d}} - \hat{\vec{\bar{d}}})^t \overline{W}(I - \overline{F})^{-1}(\vec{\bar{d}} - \hat{\vec{\bar{d}}}),$$

where $n_a$ is the number of smoothing constrains that augment the data. This can be looked at as the ML estimate of $\sigma_d^2$ with residuals being modeled as zero-mean Gaussian distributed with covariance $\sigma_d^2(I-\overline{F})\overline{W}^{-1}$. Since $I-\overline{F}$ is a full matrix, the residuals are very strongly correlated (at least locally) and nowhere close to independent. However, in practice, approximating the residuals to be independent for the purpose of estimating $\sigma_d^2$ does not result in a significant degradation and has the advantage of saving us the computation of inverting I−F, which is a large $(m+n_a)\times(m+n_a)$ matrix. There are numerical issues involved in the inversion of I−F as well since it does not have full rank. A pseudo inverse can be employed but in practice it is better to approximate it as a diagonal matrix and just invert the diagonal entries for the purpose of estimating scale. Approximating independence and restricting the trace to the data portion yields $$\hat{\sigma}_d^2 \approx \frac{1}{m}\sum_{i=1}^{m} \frac{W_{ii}}{1-F_{ii}}(d_i - \hat{d}_i)^2. \qquad (60)$$

Note that Eqs. (54) and (60) taken together make the estimated covariance $\hat{\Sigma}_{\hat{a}}$ of the output prediction invariant to the scale of weights specified for the input data as well as the weights estimated during robust fitting. This a desirable property as there may be errors in the estimation of the scale of the input data covariance due to modeling errors.

1.4.2 Unbiased Estimate of $\sigma_d^2$

The noise estimate given by Eq. (60) can potentially be biased lower when robust fitting is performed. Large outliers are suppressed by dialing down the robust weights but in the process other sample points that fall in the true distribution are also de-weighted significantly if they are far away from the mean of the distribution. The exact expression for the bias is difficult to compute analytically when robust fitting is performed without making simplifying assumptions that are typically not valid in practice. Instead, we will use our intuition to come up with a correction factor that accounts for this bias and verify the resulting expression via Monte Carlo simulations.

When computing statistics from N independent samples, we know that the variance of the estimated statistic goes down as 1/N, i.e., each sample has an effective contribution of 1. In robust fitting, we have a weight assigned to each sample i at iteration l, $w_i^{(l)}$, where $0 \le w_i^{(l)} \le 1$. We can look at this weight as the effective contribution of sample i to reducing the variance of the estimated quantity. As the sample moves further away from the mean of the distribution, it contributes less and less to the result increasing the variance of the final estimate. The ratio of effective number of data samples and the actual number of data samples can then serve as a bias correction factor for our estimated noise. Towards this end, we define $$K = \frac{1}{m}\sum_{i=1}^{m} w_i^{(*)}, \qquad (61)$$

where $w_i^{(*)}$ denotes the robust weight assigned to sample i at convergence.

Also, note that an estimate of the input data noise similar to that given by Eq. (60) was obtained as part of robust fitting. See Sec. 1.2.6 and the robust estimate of noise given by Eq. (28). We can utilize this estimate along with the heuristic correction factor K to obtain an unbiased estimate $$\hat{\sigma}_d^2 = \frac{1}{K}\hat{\sigma}^{2(*)}, \qquad (62)$$

where $\hat{\sigma}^{(*)}$ is the estimated noise in robust fitting at convergence. Alternatively, we can obtain an unbiased estimate from Eq. (60) and our heuristic correction factor K as follows (Note we use $K^2$ rather than K to normalize here since the residuals are multiplied by the robust weights in the numerator)

$$\hat{\sigma}_d^2 = \frac{1}{K_2(m+n_a-n_p)}\sum_{i=1}^{m} \frac{W_{ii}}{1-F_{ii}}(d_i - \hat{d}_i)^2, \qquad (63)$$

where we have accounted for the number of degrees of freedom in the model ($n_p$) and the total number of constraints (m data points and $n_a$ smoothing constraints). Typically, the number of smoothing constraints is equal to the number of parameters so the normalization is close to m as in Eq. (60). In practice, the two estimates given by Eqs. (62) and (63) are very close to each other. In case no robust fitting is performed, the unbiased noise estimate is obtained by Eq. (63) with K=1.

2 Image Registration Algorithm

FIG. 3 shows an exemplary data flow of the overall registration method 10. The image correlation process 18 done block-wise fashion across the image provides the warp estimates between the two bands, e.g. reference image 12 and warped image 14. These data estimates are noisy due to imperfect correlation and may be grossly off when the image content does not correlate well across the two spectral bands. The image correlation process may optionally also estimate the uncertainty associated with the estimated warp data. Those skilled in the art will readily appreciate that that any suitable method for estimating the warp and the associated uncertainty from image data can be used. These noisy warp data 20 estimates along with the uncertainty information 21 is fed to the separable spline warp model 16 to optimally filter the data (as explained above in Sec. 1) and correct the errors made in the image correlation process 18. Details of this estimation process are provided in FIGS. 4 and 5 as described below. The spline warp model produces reduced noise or de-noised warp estimates 22 and the associated uncertainty 23 with the data. These estimates may optionally be combined 25 with an independent warp estimate obtained from platform motion data to produce refined warp 27. Details of how the motion data is incorporated into the warp estimate is provided in FIG. 6, as described below. The refined warp data 27 is then fed to an image resampling module 24 that resamples the warped band/image 14 to produce the final registered image 26.

Figure 4:
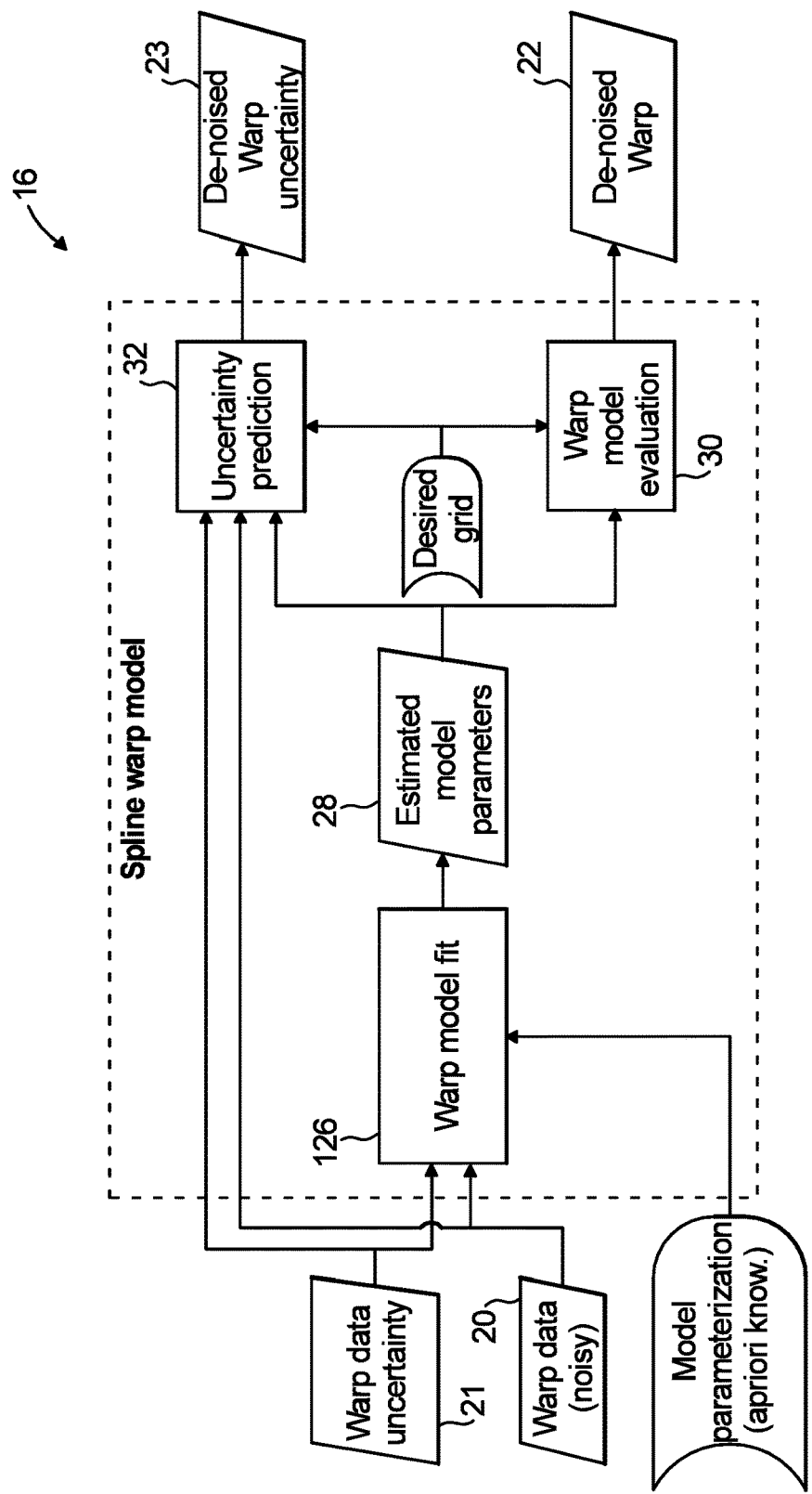
FIG. 4 is a data flow diagram of an exemplary embodiment of a method of modeling warp for image registration in accordance with the present disclosure.

The internal data flow within the spline warp model 16 is shown in FIG. 4. The warp model is first fitted 126 to the data 20 to obtain the unknown model parameters 28. If no uncertainty estimates are available for the warp data, the model fitting is performed using regular least squares as in eq. (13). If uncertainty estimates 21 are available, then either eqs. (17) or (19) are employed. If the input uncertainty estimates 21 are unreliable and the warp data has outliers, a robust fitting procedure is employed and eq. (23) is used after the robust fitting procedure has converged. If the smoothing model is employed for the spline coefficients then fitting is done using eq. (45) when the input uncertainty information is not available and eq. (47) when either the input uncertainty is available or reconstructed using robust fitting. The warp model is then evaluated 30 at the grid locations required by the image resampling routine to dewarp the warped image 14 and register it to the reference image 12 (shown in FIG. 3). The estimated parameters 28 are used in eqs. (4), (5) and (6) to compute the slope, offset, and optical distortion profiles respectively and then eq. (3) is used to compute the de-noised warp 22 at the desired grid locations. The uncertainty of the de-noised warp 23 is predicted 32 using the fitted model parameters 28, the noisy warp data 20 and its associated uncertainty 21.

Figure 5:
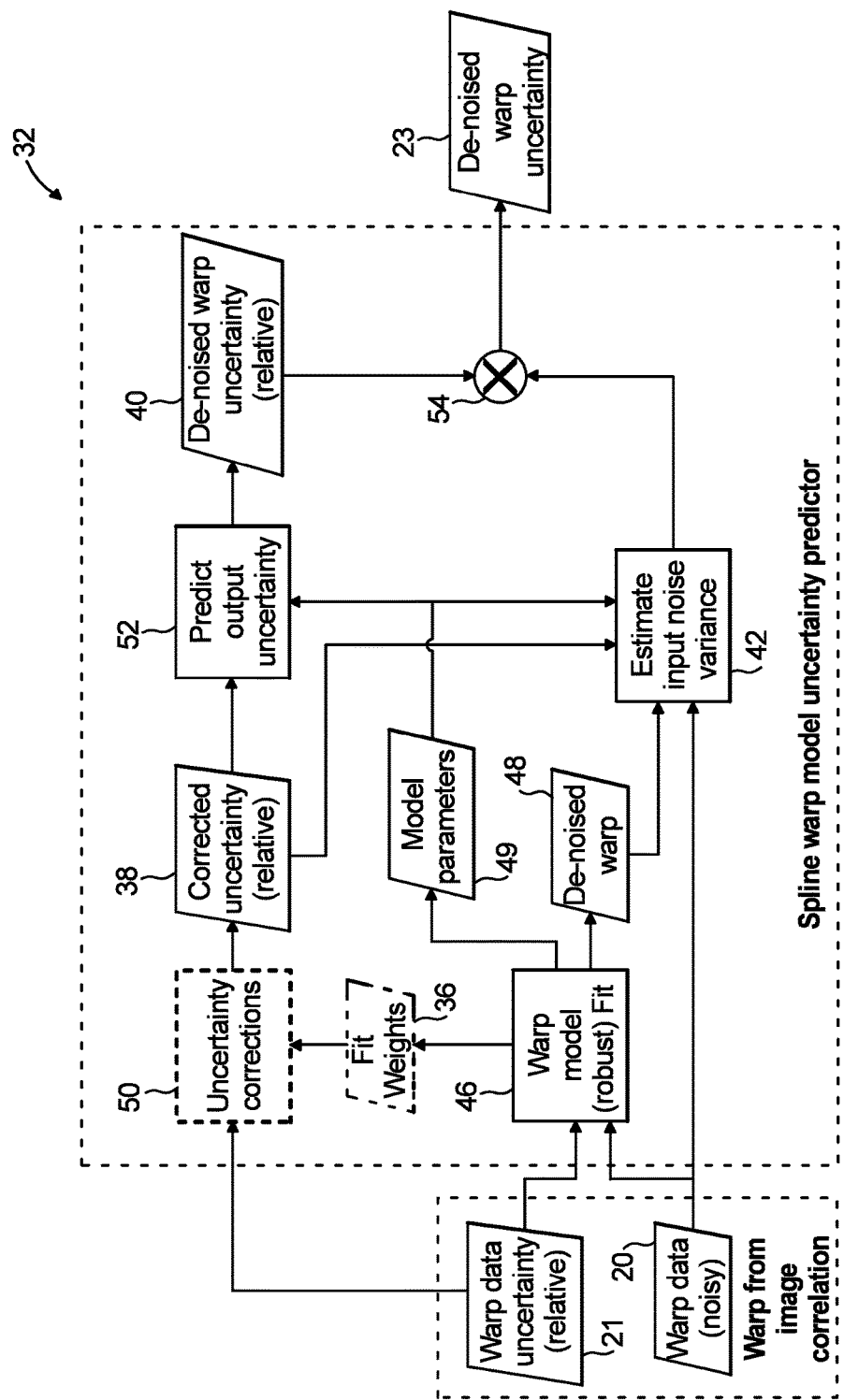
FIG. 5 is a data flow diagram of uncertainty estimation in accordance with an embodiment of the present disclosure.

FIG. 5 shows the details for the uncertainty estimation process 32 for predicting the uncertainty of the de-noised warp 22. If robust fitting is performed, first the warp data uncertainties 21 are corrected 50 using the robust fitting weights 36 that identify the outliers to produce the corrected relative uncertainties 38. The robust fitting weights are given by eq. (30). This correction process is skipped if no robust fitting is performed. The fitted model parameters are used to obtain the filtering matrix in eq. (51), which is then applied to the corrected relative uncertainty 38 using eq. (52) by process 52 to obtain the de-noised warp relative uncertainty 40. Finally, the noise on the input warp data is estimated 42 by comparing the de-noised warp data 48, e.g., which can be the same as the de-noised warp 22 of FIG. 4, to the input noisy warp data 20 with the knowledge of the fitted parameters 49, e.g., which can be the same as the parameters 28 of FIG. 4, and the corrected relative uncertainty 38. In particular, the noise variance is estimated using eq. (60) when no robust fitting is performed and eqs. (62) or (63) is used when robust fitting is performed. This noise estimate is multiplied 54 with the de-noised warp relative uncertainty 40 to obtain the final de-noised warp uncertainty 23.

Figure 6:
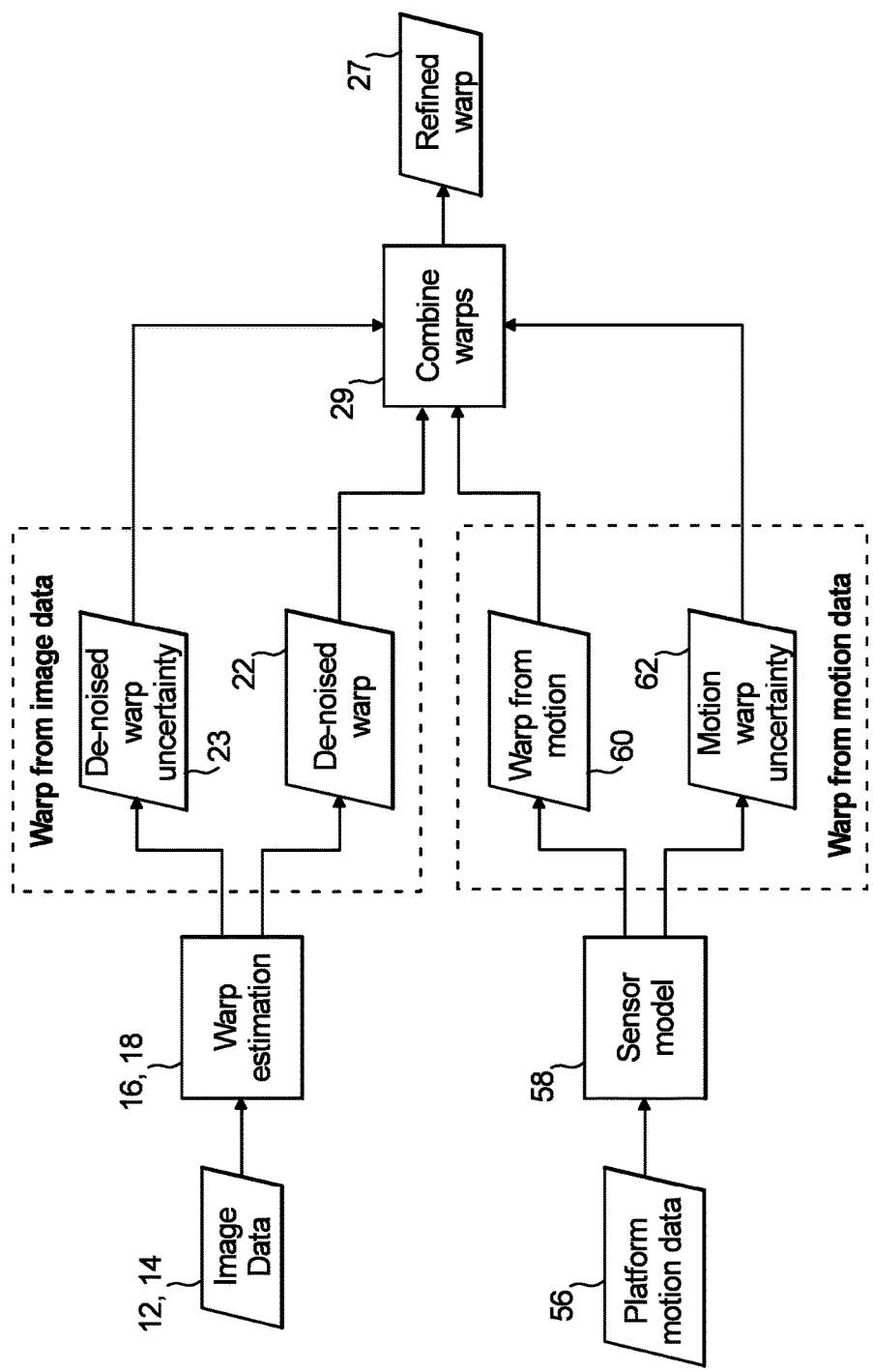
FIG. 6 is a data flow diagram for an exemplary embodiment of estimating warp with motion data.

FIG. 6 shows an exemplary embodiment where the de-noised warp uncertainty 23 of the predicted de-noised warp 22 can be utilized to further refine the warp if there is an alternate method of computing the warp. This refined warp 27 can be used instead of the de-noised warp 22 to perform the image resampling and register the warped image 14 with respect to the reference image 12. If motion data 56 is available for the platform, e.g., an aircraft/space platform, an estimate of the warp 60 between the reference and warp image can be obtained by utilizing a sensor model 58. Such a method of using a sensor model to produce a warp is understood by those skilled in the art. The knowledge of the noise in the measurements of the platform motion can also be utilized to obtain the uncertainty 62 of the warp computed from the motion data 56. It has been explained above how the de-noised warp data and its associated uncertainty can be obtained from image data. These two independent estimates of the warps and their associated uncertainty can be optimally combined 29 to produce a final refined warp 27. Let $\hat{\vec{g}}$ denote the warp estimate obtained from motion data and let $\Sigma_{\hat{g}}$ denote the associated uncertainty of this data. Then the optimal estimate of the overall warp $\vec{h}$ (refined warp) is obtained as $$\vec{h} = (\Sigma_{\hat{d}}^{-1} + \Sigma_{\hat{g}}^{-1})^{-1}(\Sigma_{\hat{d}}^{-1}\vec{d} + \Sigma_{\hat{g}}^{-1}\vec{g}) \quad (64)$$

where $\hat{\vec{d}}$ is the de-noised warp estimate from image data obtained from eq. (50) and $E_{\hat{d}}$ is the associated uncertainty of this data obtained from eq. (54).

Those skilled in the art will readily appreciate that a system for registering images can include a module configured to implement machine readable instructions to perform one or more of the method embodiments described above.

As will be appreciated by those skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in a flowchart and/or block diagram block or blocks The methods and systems of the present disclosure, as described above and shown in the drawings, provide for imagery with superior properties including improved multi-band/multi-spectral image registration. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method for modeling warp for registration of images comprising:
   receiving input warp data; and
   performing a fitting process on the input warp data to produce at least one of reduced noise warp data or reduced noise warp uncertainty, wherein the warp for the at least one of reduced noise warp data or reduced noise warp uncertainty is modeled with components including:
     an offset that varies in time; and
     a non-linear distortion that does not vary with time;
   outputting the at least one of reduced noise warp data or reduced noise warp uncertainty;
   predicting reduced noise warp uncertainty and utilizing the reduced noise warp uncertainty to generate a refined warp by incorporating motion data; and
   registering a warped band using the refined warp.

2. A method as recited in claim 1, wherein the warp is modeled with components including a slope that varies in time.

3. A method as recited in claim 2, wherein performing the fitting process includes modeling the slope and offset as splines.

4. A method as recited in claim 3, wherein a smoothing model for slope and offset spline coefficients is incorporated in the fitting process.

5. A method as recited in claim 4, wherein incorporating a smoothing model in the fitting process includes minimizing curvature of the offset and slope splines.

6. A method as recited in claim 3, wherein the splines have non-uniformly placed knots.

7. A method as recited in claim 3, wherein the splines are cubic.

8. A method as recited in claim 2, wherein the fitting process includes modeling the warp as $$d_x(x,y)=s_x(y)x+c_x(y)+o_x(x)$$

$$d_y(x,y)=s_y(y)x+c_y(y)+o_y(x)$$

where $d_x(\bullet,\bullet)$ and $d_y(\bullet,\bullet)$ are x and y components of the warp, respectively, $s_x(\bullet)$ and $c_x(\bullet)$ denote slope and offset as a function of time for the x component of the warp, $s_y(\bullet)$ and $c_y(\bullet)$ denote the slope and offset as a function of time for the y component of the warp, and $o_x(\bullet)$ and $o_y(\bullet)$ denote distortion that is constant in time but varies along a sensor array, and y in the functions denotes time and x in the functions denotes distance along the sensor array.

9. A method as recited in claim 1, wherein performing the fitting process includes modeling the non-linear distortion as a polynomial.

10. A method as recited in claim 1, further comprising:
    receiving input warp data uncertainty for the input warp data, wherein performing the fitting process includes using the input warp data uncertainty in producing the reduced noise warp data.

11. A method as recited in claim 10, wherein performing the fitting process includes correcting errors in the input warp data uncertainty by performing a robust fitting process on the input warp data.

12. A method as recited in claim 10, further comprising:
    predicting reduced noise warp uncertainty using the input warp data uncertainty and utilizing the reduced noise warp uncertainty to generate a refined warp by incorporating motion data; and
    registering a warped band using the refined warp.

13. A method as recited in claim 12, further comprising using a sensor model to produce warp data from motion and motion warp uncertainty, wherein the refined warp is produced by combining the reduced noise warp, the reduced noise warp uncertainty, the warp data from motion, and the motion warp uncertainty.

14. A method as recited in claim 13, wherein combining the reduced noise warp, the reduced noise warp uncertainty, the warp data from motion, and the motion warp uncertainty includes obtaining the refined warp $\hat{\vec{h}}$ as $$\hat{\vec{h}}=(\Sigma_{\vec{d}}^{-1}+\Sigma_{\vec{g}}^{-1})^{-1}(\Sigma_{\vec{d}}^{-1}\hat{\vec{d}}+\Sigma_{\vec{g}}^{-1}\hat{\vec{g}})$$

where $\hat{\vec{d}}$ is the reduced noise warp, $\Sigma_{\vec{d}}$ is the reduced noise warp uncertainty, $\hat{\vec{g}}$ denotes the warp data from motion, and $\Sigma_{\vec{g}}$ denotes the motion warp uncertainty.

15. A method as recited in claim 10, further comprising:
    using the input warp data uncertainty to produce relative input warp data uncertainty;
    using the relative input warp data uncertainty in a warp model robust fit to produce fit weights;
    using the fit weights and relative input warp data uncertainty to produce corrected relative input warp data uncertainty;
    predicting relative reduced noise warp data uncertainty from the corrected relative input warp data uncertainty;
    using the reduced noise warp data and the input warp data to estimate input noise variance; and
    multiplying the relative reduced noise warp data uncertainty and the input noise variance to produce the reduced noise warp data uncertainty.

16. A system including:
a module configured to implement machine readable instructions to:
receive input warp data; and
perform a fitting process on the input warp data to produce at least one of reduced noise warp data or reduced noise warp uncertainty, wherein the warp for the at least one of reduced noise warp data or reduced noise warp uncertainty is modeled with components including:
an offset that varies in time; and
a non-linear distortion that does not vary with time;
output the at least one of reduced noise warp data or reduced noise warp uncertainty;
predict reduced noise warp uncertainty and utilizing the reduced noise warp uncertainty to generate a refined warp by incorporating motion data; and
register a warped band using the refined warp.

17. A system as recited in claim 16, wherein the module is configured to implement machine readable instructions wherein performing the fitting process includes modeling the slope and offset as splines.

18. A system as recited in claim 16, wherein the module is configured to implement machine readable instructions wherein performing the fitting process includes modeling the non-linear distortion as a polynomial.

19. A system as recited in claim 16, wherein the module is configured to implement machine readable instructions including instructions to:
receive a reference image and a warped image;
correlate the reference and warped images to produce noisy warp data;
perform a fitting process on the noisy warp data to produce reduced noise warp data, wherein the warp for the reduced noise warp data is modeled with components including:
an offset that varies in time; and
a non-linear distortion that does not vary with time; and
resampling the warped image using the reduced noise warp data to produce a registered image that is registered to the reference image.

20. A method for registration of images comprising:
receiving a reference image and a warped image;
correlating the reference and warped images to produce noisy warp data;
performing a fitting process on the noisy warp data to produce reduced noise warp data, wherein the warp for the reduced noise warp data is modeled with components including:
an offset that varies in time; and
a non-linear distortion that does not vary with time;
resampling the warped image using the reduced noise warp data to produce a registered image that is registered to the reference image
receiving motion data; and
combining the motion data with the reduced noise warp and the reduced noise warp uncertainty to produce a refined warp, wherein resampling the warped image using the reduced noise warp data includes using the refined warp to produce the registered image.

21. A method as recited in claim 20, wherein correlating the reference and warped images includes producing warp data uncertainty.

22. A method as recited in claim 21, wherein performing the fitting process includes generating reduced noise warp uncertainty.

* * * * *